(12) United States Patent
Guo et al.

(10) Patent No.: US 10,928,551 B2
(45) Date of Patent: Feb. 23, 2021

(54) ISOTROPIC FILTERS IN SPATIAL FREQUENCY DOMAIN BY A PHOTONIC CRYSTAL SLAB

(71) Applicant: The Board of Trustees of the Leland Stanford Junior University, Stanford, CA (US)

(72) Inventors: Cheng Guo, Stanford, CA (US); Meng Xiao, Wuhan (CN); Momchil Minkov, Hayward, CA (US); Yu Shi, Redmond, WA (US); Shanhui Fan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 170 days.

(21) Appl. No.: 16/190,820

(22) Filed: Nov. 14, 2018

(65) Prior Publication Data

US 2019/0146120 A1  May 16, 2019

Related U.S. Application Data

(60) Provisional application No. 62/585,816, filed on Nov. 14, 2017.

(51) Int. Cl.
*G02B 1/00* (2006.01)
*G02B 5/28* (2006.01)

(52) U.S. Cl.
CPC .............. *G02B 1/005* (2013.01); *G02B 5/28* (2013.01)

(58) Field of Classification Search
CPC .................................. G02B 1/005; G02B 5/28
See application file for complete search history.

(56) References Cited

U.S. PATENT DOCUMENTS

| | | | | |
|---|---|---|---|---|
| 9,065,249 | B2 * | 6/2015 | Chua | H01S 5/18 |
| 2014/0293467 | A1 * | 10/2014 | Palikaras | G02B 5/0841 |
| | | | | 359/885 |
| 2016/0252652 | A1 * | 9/2016 | Shen | G02B 5/20 |
| | | | | 359/485.02 |

OTHER PUBLICATIONS

Suh et al., Mechanically switchable photonic crystal filter with either all-pass transmission or flat-top reflection characteristics, Optics Letters vol. 28, No. 19, pp. 1763-1765. (Year: 2003).*

* cited by examiner

*Primary Examiner* — Kimberly N. Kakalec
(74) *Attorney, Agent, or Firm* — Lumen Patent Firm

(57) ABSTRACT

An isotropic imaging filter is provided that includes a photonic crystal slab, where the photonic crystal slab includes a square lattice of air through holes, a dielectric constant, a thickness (d), a through hole radius (r), and a lattice constant (a), where the square lattice of air holes are separated according to a value of the lattice constant, where the thickness is configured according to d=M(a), where the through hole radii is configured according to r=N(a), where the thickness and the hole radii are configured to generate isotropic bands of guided resonances of an incident image.

7 Claims, 6 Drawing Sheets

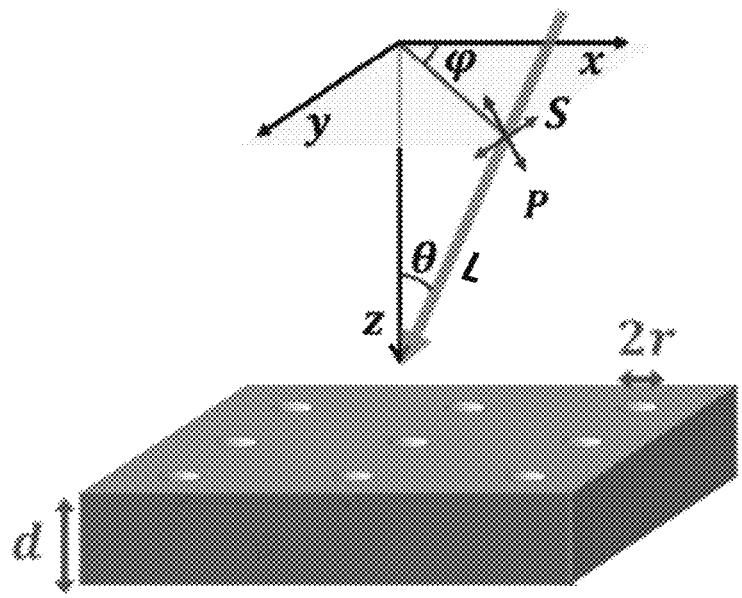
FIG. 1A
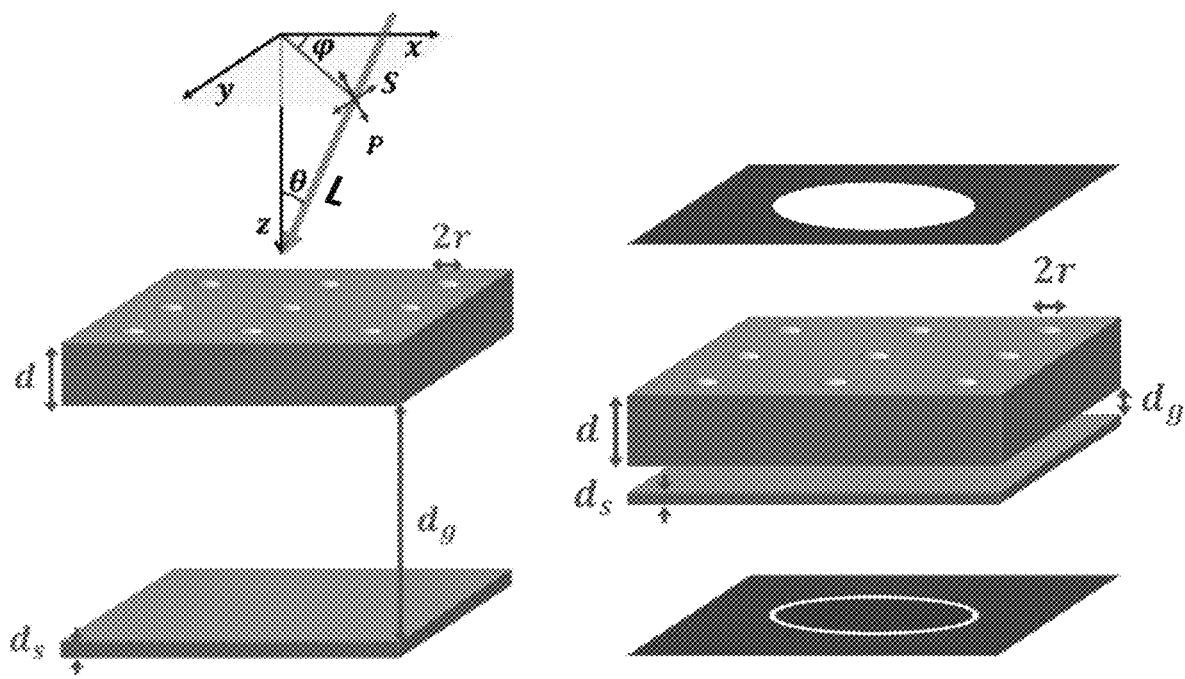
FIG. 1B
FIG. 1C

ISOTROPIC FILTERS IN SPATIAL FREQUENCY DOMAIN BY A PHOTONIC CRYSTAL SLAB

CROSS-REFERENCE TO RELATED APPLICATIONS

This application claims priority from U.S. Provisional Patent Application 62/585,816 filed Nov. 14, 2017, which is incorporated herein by reference.

STATEMENT OF GOVERNMENT SPONSORED SUPPORT

This invention was made with Government support under contract FA9550-17-1-0002 awarded by the United States Air Force. The Government has certain rights in the invention.

FIELD OF THE INVENTION

The invention generally relates to optical filters. More particularly the current invention relates to a single photonic crystal slab isotropic image filter device operating in the wavevector domain.

BACKGROUND OF THE INVENTION

Filtering in the wavevector domain is widely used in image processing. Due to the two-dimensional nature of images, isotropic filters, where the responses depend on the magnitude but not the orientation of the wavevectors, are particularly useful. The most commonly used isotropic filters are high-pass, low-pass, band-reject, and band-pass filters, all defined in the wavevector domain.

In conventional Fourier optics, to achieve filtering in the wavevector domain, one first obtains a Fourier transformation of an image on a Fourier plane by passing the image through a lens. One then performs spatial filtering on the Fourier plane, followed by a Fourier transformation again through a second lens. Such a technique requires long propagation distance and therefore results in a bulky system.

In recent years, there has been significant progress in using nanophotonic structures to develop a compact device for analog optical computing. Specifically, many efforts have been made on achieving spatial differentiation of an incoming image, which in fact corresponds to a high-pass filter in the wavevector domain. While most initial works on nanophotonic structures have focused on demonstrating one-dimensional differential operators, more recent works have shown that two-dimensional differential operators, including, in particular, the Laplace operator, which is a high-pass filter, can be achieved using nanophotonic structures in either reflection or transmission.

What is needed is a compact, real-time and high-throughput image processing device with reduced energy consumption and increased speed.

SUMMARY OF THE INVENTION

To address the needs in the art, an isotropic imaging filter is provided that includes a photonic crystal slab, where the photonic crystal slab includes a square lattice of air through holes, a dielectric constant, a thickness (d), a through hole radius (r), and a lattice constant (a), where the square lattice of air holes are separated according to a value of the lattice constant, where the thickness is configured according to d=M(a), where the through hole radii is configured according to r=N(a), where the thickness and the hole radii are configured to generate isotropic bands of guided resonances of an incident image.

According to one aspect of the invention, the guided resonances can include an isotropic high-pass filtered image, an isotropic low-pass filtered image, an isotropic band-reject filtered image, or an isotropic band-pass filtered image, where the isotropic low-pass filtered image and the isotropic band-pass filtered image comprise a reflected incident image, where the isotropic high-pass filtered image and the isotropic band-reject filtered image include a transmitted incident image. In one aspect, the invention further includes a beam splitter, where the beam splitter is configured to separate the incident image from the reflected incident image.

In another aspect of the invention, the photonic crystal slab includes a dielectric material.

According to another aspect, the invention further includes a uniform dielectric slab with a thickness $d_s$ disposed proximal to the photonic crystal slab, wherein an air gap $d_g$ between the uniform dielectric slab and the photonic crystal slab is configured according to $d_g=T(a)$, where $d_s$ is configured according to $d_s=B(a)$, where $d_s$ and the $d_g$ are disposed to set a background transmission to unity. In one aspect, the uniform dielectric slab gap factor T has a value that disposes the dielectric slab in a position to set a background transmission to unity.

In another aspect of the invention, the hole radii factor N has a value in a range of N≤0.5.

In a further aspect of the invention, the thickness factor M and the radii N are optimized together to establish an isotropic band structure of a guided resonance.

BRIEF DESCRIPTION OF THE DRAWINGS

FIGS. 1A-1C show (1A) a schematic drawing of the geometry of a single slab device having a photonic crystal slab with a square lattice of air holes, (1B) a schematic drawing of the geometry of a single slab device having a photonic crystal slab with a square lattice of air holes separated from a uniform dielectric slab by an air gap. The slabs have a dielectric constant ε=4.67. The geometry parameters are d=0.50a, r=0.11a, $d_s$=0.12a, and for FIG. 1B $d_g$=1.93a, where a is the lattice constant. The coordinate system is shown above the device. The arrow (L) indicates the direction of the incident light. The electric field directions of the S- and P-polarized light are also indicated. (1C) Geometry of the photonic crystal slab differentiator, which shows a photonic crystal slab separated from a uniform dielectric slab by an air gap. For ε=12, the geometry parameters are: d=0.55a, r=0.111a, $d_s$=0.07a, $d_g$=0.21a. The plane above and below shows the input and output image respectively. The transmitted image (e.g. ring) through the device is the Laplacian of the incident image (e.g. disk) illuminated by a normally incident light with frequency $\omega_0$=0.47656×2πc/a, according to embodiments of the current invention.

DETAILED DESCRIPTION

Figure 2A:
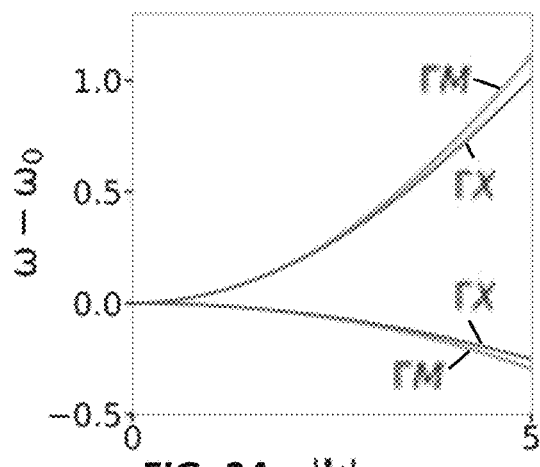
FIGS. 2A-2F show (2A), (2C), and (2D), nearly isotropic photonic band structure of the photonic crystal slab shown in FIGS. 1A-1B near the frequency $\omega_0$=0.77098×2π/a. (2A) Band dispersions along Γ-X and Γ-M directions. (2C) Constant frequency contours of the lower band. (2D) Constant frequency contours of the upper band. (2B) Scheme of multiple filtering functions of the device. When the light frequency is on resonance at the normal incidence [ω=$\omega_0$, labeled by dark arrows in (2B) and bottom horizontal lines in (2E), (2F)], the device realizes an isotropic high-pass filter (Laplacian) at transmission and low-pass filter at reflection. When the light frequency is detuned from the resonance at the normal incidence [ω=ω$_k$, labeled by gray arrows in (2B) and top horizontal lines in (2E), (2F)], the device realizes an isotropic band-reject filter at transmission and band-pass filter at reflection. (2E) Transmittance |t| for S-polarized light as a function of ω and |k| near ω$_0$=0.77098×2πc/a along a general wavevector direction (φ=14°). Due to the isotropic band structure, S light only excites the upper band, and the transmission spectra are almost identical along any wavevector direction φ. |t|=0 when ω=ω$_k$. (2F) Reflectance |r| for S-polarized light as a function of ω and |k| near ω$_0$=0.77098×2πc/a along a general wavevector direction (φ=14°). The reflection spectra are identical along any wavevector direction. |r| 1 when ω=ω$_k$. In all of the plots, frequency ω-ω$_0$ is in units of $10^{-4}$×2πc/a, while |k|, k$_x$, and k$_y$ are in units of $10^{-3}$×2π/a, according to the current invention.

Disclosed herein is a showing that several types of isotropic image filters in the wavevector domain can be implemented with a single photonic crystal slab device, according to the current invention. According to one embodiment, a slab is provided that is configured so that the guided resonance near the Γ point exhibits an isotropic band structure. Depending on the light frequency and the choice of transmission or reflection mode, the invention realizes isotropic high-pass, low-pass, band-reject, and band-pass filtering in wavevector space. These filter functions are important for various image processing tasks, including edge detection, smoothing, white noise suppression, and suppression or extraction of periodic noises. Further disclosed is a numerical demonstration of these filter functionalities by simulations of a slab structure that is designed to operate in the visible wavelength range. The current invention expands the application of nanophotonics-based optical analog computing for image processing.

The purpose of filtering in the wavevector domain is to trans-form an image by modifying its Fourier transformation. In general, for a normally incident light beam along the z axis with a transverse field profile S$_{in}$(x, y), the transmitted or reflected beam has a profile S$_{out}$(x, y)=$\mathcal{F}^{-1}$[H(k$_x$, k$_y$)$\tilde{S}_{in}$(k$_x$, k$_y$)], where $\mathcal{F}^{-1}$ is the inverse Fourier transform, $\tilde{S}_{in}$(k$_x$, k$_y$) is the Fourier transform of the input image, and H(k$_x$, k$_y$) is the filter transfer function. If H(k$_x$, k$_y$)=H(|k|) only depends on the magnitude of the wavevector |k|, the filter is isotropic. Here, k=(k$_x$, k$_y$) refers to the in-plane wavevector.

According to one embodiment of the invention, the isotropic filters are realized by a photonic crystal slab device, as shown in FIGS. 1A-1c. The photonic crystal slab of the current invention exhibits a nontrivial isotropic band structure near the Γ point. The design details for such a photonic crystal slab, see for example the embodiment shown FIG. 1C. The exemplary embodiment shown in FIG. 1C can use either Si, GaAs, or any dielectric, where Si, or GaAs is applicable only in the infrared wavelength range. Further embodiments follow the same principle as the embodiment shown in FIG. 1C to enable a structure that can operate in the visible wavelength range. In one embodiment, the dielectric constant of the material for the slabs is ε=4.67, which approximates that of Si$_3$N$_4$ in the visible wavelength range. Provided here is a dielectric constant that is real, as the extinction coefficient of Si$_3$N$_4$ at a visible wavelength is negligible. The photonic crystal slab has a thickness of d=0.50a and a square lattice of air holes with radii r=0.11a, where a is the lattice constant. The thickness d and radius r are chosen to realize isotropic bands of guided resonances. A uniform dielectric slab with a thickness d$_s$=0.12a is placed in the vicinity of the photonic crystal slab. The air gap between the two slabs has a thickness d$_g$=1.93a. d$_s$ and d$_g$ are chosen to set the background transmission to be unity. As a side note, the two-layer structure discussed herein is quite compact. For a resonant wavelength λ=500 nm, a=650 nm, the total thickness is $d+d_g+d_s=1.66$ µm. Such a structure can be fabricated using, e.g., focused ion beam assisted laser interference lithography.

The photonic crystal slab in FIGS. 1A-1C hosts a pair of guided resonances, which are degenerate at the Γ point with a frequency $\omega_0=0.77098\times 2\pi c/a$. In general, in the vicinity of the Γ point, the band structure is highly anisotropic in the k space, assuming only the $C_{4v}$ symmetry of the structure. However, remarkably, with the carefully tuned geometry parameters above, both bands of the guided resonances exhibit almost complete circular symmetry in the real part of the eigenfrequencies:

$$\omega_k \approx \omega_0 A|k|^2, \tag{1}$$

where $A_+=4.35$, $A_-=-1.41$ from fitting the band dispersion, and the upper (lower) sign corresponds to the upper (lower) band. In Eq. (1), and throughout the rest of this disclosure, the wavevector will be in units of $2\pi/a$.

Figure 2B:
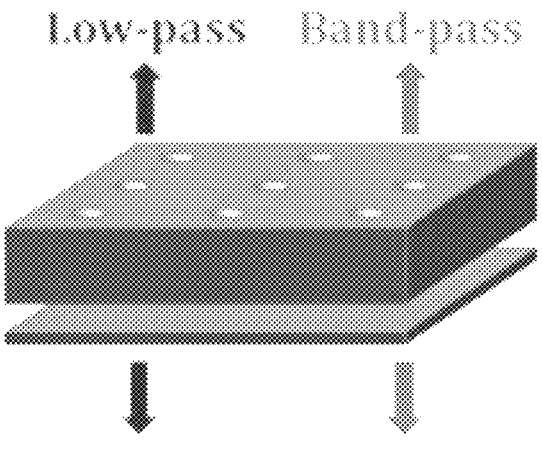
Figure 2C:
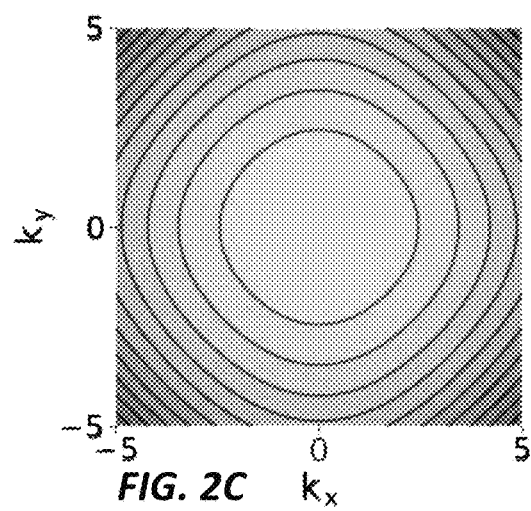
Figure 2D:
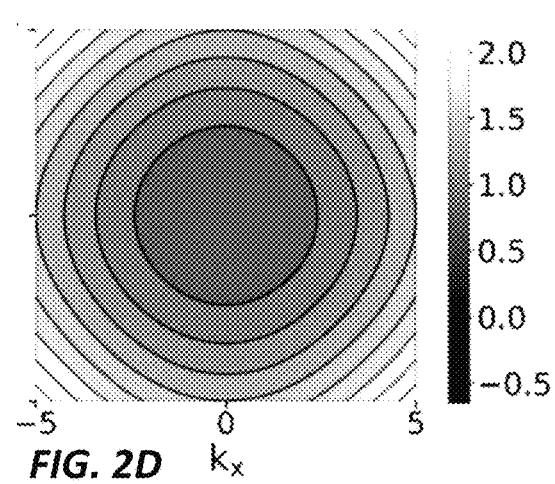

The nearly isotropic photonic band structure $(\omega_\pm(k)-\omega_0)$ for the structures shown in FIGS. 1B-1C are plotted in FIG. 2A, FIG. 2C, and FIG. 2D. FIG. 2A shows that for both bands, the dispersions along the Γ-M and Γ-X directions have almost identical effective masses. Here, the effective mass tensor is defined as $m_{ij}^*=\hbar[\partial^2\omega(k)/\partial k_i \partial k_j]^{-1}$. FIG. 2C and FIG. 2D show that the constant frequency contours for both bands are almost circular. It is noted here that the radiative linewidths $\gamma_\pm(k)$, unlike $\omega_\pm(k)$ are anisotropic. Nonetheless, $(\gamma_\pm(k)-\gamma_0)$ are much smaller than $(\omega_\pm(k)-\omega_0)$, thus, they do not affect the circular symmetry of the transfer functions much, as we will show later.

In general, guided resonances in photonic crystal slabs may induce sharp Fano resonance features in the transmission and reflection spectra. For the specific pair of guided resonances considered here, it has been proved that, due to the isotropic band structure, S-polarized (P-polarized) light can only excite the upper (lower) band for every direction of incidence. This effect is referred to as single-band excitation.

Due to the single-band excitation effect, as well as the presence of the uniform dielectric slab, which sets the background transmission coefficient to be unity, for this structure shown in FIGS. 1B-1C, the transmission and reflection coefficients are $$t_\pm(\omega,k) = \frac{i[\omega-\omega_\pm(k)]}{i[\omega-\omega_\pm(k)]+\gamma_\pm(k)}, \tag{2}$$

$$r_\pm(\omega,k) = -e^{i\phi}\frac{\gamma_\pm(k)}{i[\omega-\omega_\pm(k)]+\gamma_\pm(k)}, \tag{3}$$

where the upper (lower) sign corresponds to S-polarized (P-polarized) light and upper (lower) band; ω is the incident light frequency. Therefore, on resonance, $$t_\pm(\omega_\pm(k),k)=0, \; r_\pm(\omega_\pm(k),k)=-e^{i\phi}, \tag{4}$$

Figure 2E:
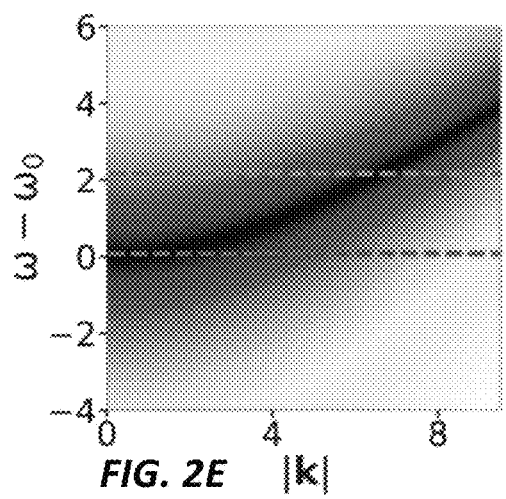
Figure 2F:
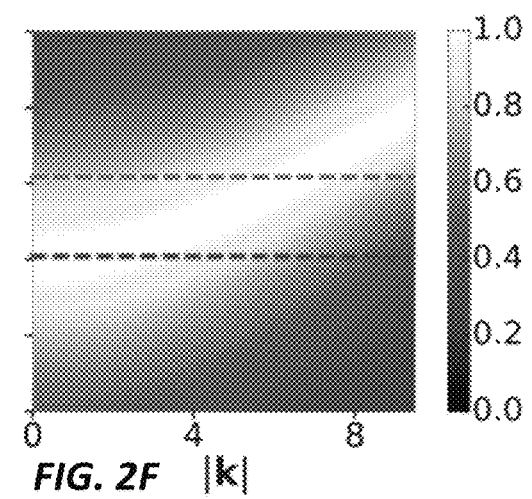

The numerically determined transmission and reflection spectra for S-polarized light are plotted in FIG. 2E and FIG. 2F. Due to the effect of single-band excitation, S-polarized light only excites the upper band of guided resonances. Moreover, as expected from Eqs. (1)-(3), the resultant transmission and reflection spectra are isotropic, i.e., the spectra are identical along any wavevector direction as defined by the azimuthal angle ϕ in FIGS. 1B-1C. When ω=ω(k), the transmittance exhibits sharp dips with |t|=0, while the reflectance exhibits peaks with |r|=1, as expected from Eq. (4).

Depending on the operating conditions, the structures as shown in FIGS. 1A-1C can be used to perform several very useful image processing functionalities.

Turning now to the isotropic high-pass filter embodiment, where the inventors have shown the k-dependent transmittance at the frequency $\omega=\omega_0\equiv\omega_\pm(k=0)$ $$|t_\pm(\omega_0,k)| = \frac{|\omega_\pm(k)-\omega_0|}{\sqrt{[\omega_\pm(k)-\omega_0]^2+\gamma_\pm(k)^2}} \tag{5}$$

$$\approx \frac{|\omega_\pm(k)-\omega_0|}{\gamma_0} = \frac{A_\pm}{\gamma_0}|k|^2, \tag{6}$$

This transmittance realizes the Laplacian, a special isotropic high-pass filter.

Disclosed herein, it is show that the same device can provide a few other very useful image processing functionalities under different operating conditions.

Regarding the isotropic low-pass filter embodiment, at the frequency $\omega=\omega_0$, if one considers instead the reflected light, the transfer function is $$|r_\pm(\omega_0,k)| = \frac{1}{\sqrt{1+[\omega_\pm(k)-\omega_0]^2/\gamma_\pm(k)^2}} \tag{7}$$

$$\approx \frac{1}{\sqrt{1+A_\pm^2|k|^4/\gamma_0^2}}.$$

This transfer function realizes an isotropic low-pass filter with reflection peak $|r_\pm|=1$ at the Γ point.

Regarding the isotropic band-reject filter, this embodiment is configured to operate away from the frequency $\omega_0$, but at the frequency $\omega=\omega_{\pm,q}$, where q is the amplitude of a non-zero in-plane wavevector, the transfer function then becomes $$|t_\pm(\omega_{\pm,q},k)| = \frac{|\omega_\pm(k)-\omega_{\pm,q}|}{\sqrt{[\omega\pm(k)-\omega_{\pm,q}]^2+\gamma_\pm(k)^2}}. \tag{8}$$

This transfer function realizes an isotropic band-reject filter with transmission dip $|t_\pm|=0$ at $|k|=q$.

Turning now to the isotropic band-pass filter, at the frequency $\omega=\omega_{\pm,q}$, the reflection has a transfer function $$|r_\pm(\omega_q,k)| = \frac{1}{\sqrt{1+[\omega_\pm(k)-\omega_{\pm,q}]^2/\gamma_\pm(k)^2}}. \tag{9}$$

This transfer function realizes an isotropic band-pass filter with reflection peak $|r_\pm|=1$ at $|k|=q$.

Therefore, devices according to the current invention achieve multiple filtering functions. As schematically shown in FIG. 2B, when the light frequency is on resonance at normal incidence ($\omega=\omega_0$), the devices operate as an isotropic high-pass filter (Laplacian) at the transmission mode and an isotropic low-pass filter at the reflection mode. When the light frequency is detuned a bit from the resonance at normal incidence, the device operates as an isotropic band-reject filter at the transmission mode and an isotropic band-pass filter at the reflection mode, where the rejected or passed wavevector components are determined by the light frequency detuning and polarization. For transmission mode, the transmitted image is the required filtered result. For reflection mode, the reflected image is the required filtered result, which can be separated from the incident image by using a beam splitter.

The filtering functions of the current invention are numerically demonstrated herein. The isotropic high-pass filter (Laplacian) is disclosed in FIG. 1C. Since the physical structure is different, a brief discussion of the performance of this device is disclosed herein as a Laplacian for completeness, with focus included on the other three isotropic filters.

In all the numerical demonstrations below, the incident beam is S polarized. The transmitted image is calculated following the standard way in image processing. (1) Compute the Fourier transform $\tilde{S}_{in}(k_x,k_y)$ of the incident field profile $S_{in}(x, y)$. Note the incident image is $|S_{in}(x, y)|^2$. (2) Compute the Fourier transform of the output field profile, $\tilde{S}_{out}(k_x, k_y) = H(k_x, k_y)\tilde{S}_{in}(k_x, k_y)$, where $H(k_x, k_y)$ is the transfer function. (3) Obtain the output field profile $S_{out}(x, y)$ by inverse Fourier transform. Calculate the output image $|S_{out}(x, y)|^2$.

Regarding the isotropic high-pass filter (the Lapacian) FIG. 3 shows the isotropic high-pass filter (the Laplacian). FIG. 3A plots the filter transfer function: the transmittance for S-polarized light $|t_s|(k_x, k_y)$ at the frequency $\omega_0=0.77098\times 2\pi c/a$. The transfer function is almost isotropic. FIG. 3B plots $|t_s|$ as a function of $|k|$ along a general wave-vector direction ($\phi=14°$), and the fitting result using Eqs. (5) and (6), respectively. The fitting of Eq. (5) is almost perfect in the wavevector range as shown, while the quadratic fitting using Eq. (6) is very good for $|k|$ up to $0.6\times 10^{-2}\times 2\pi/a$. These plots confirm that the device indeed operates as an isotropic high-pass filter (the Laplacian) in this case. In FIG. 3A [and also in FIG. 4A, as shown later], at larger wavevectors, the transfer function exhibits some anisotropy due to the dependency of the radiative linewidth $\gamma(k)$ on the direction of k.

Figure 3A:
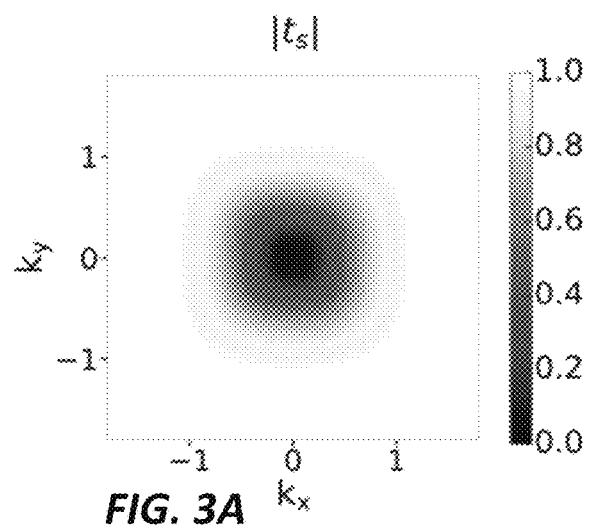
FIGS. 3A-3F show isotropic high-pass filter (Laplacian). (3A) Transmittance for S-polarized light |t$_s$| k$_x$, k$_y$ at the frequency ω$_0$=0.77098×2πc/a. (3B) |t$_s$| as a function of |k| along a general wavevector direction (φ=14°). (3C) Log plot of the Fourier transform of the field profile for the incident image (3E): log|$\tilde{S}_{in}$|(k$_x$, k$_y$). (3D) Log plot of the Fourier transform of the field profile for the reflected image (3F): log|$\tilde{S}_{out}$|(k$_x$, k$_y$). The low wavevector components have been filtered out. (3E) Incident image |S$_{in}$|$^2$ of the Stanford emblem. The image size is 5220a×3456a. (3F) Calculated transmitted image |S$_{out}$|$^2$, which shows the edges with different orientations. |k| k$_x$, and k$_y$ are in units of $10^{-2}$×2π/a, according to the current invention.
Figure 3B:
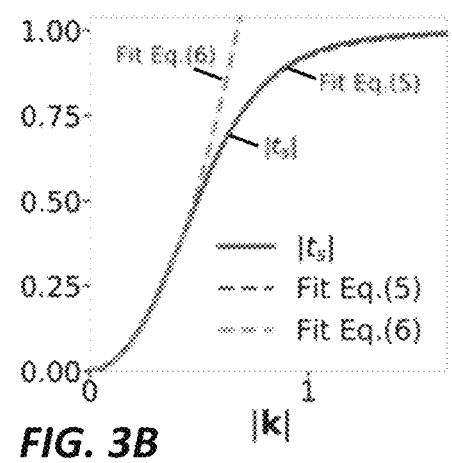
Figure 3C:
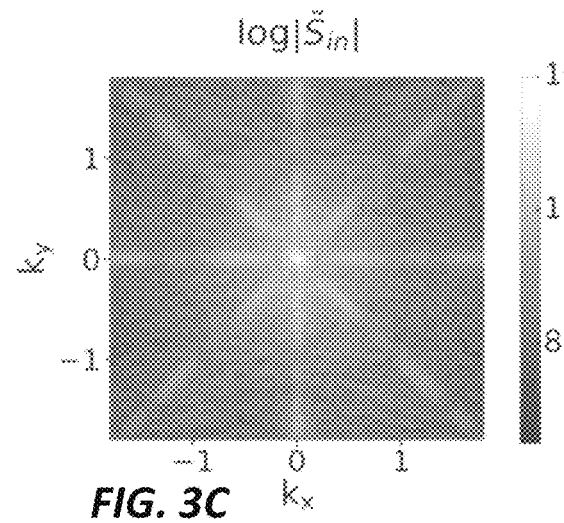
Figure 3D:
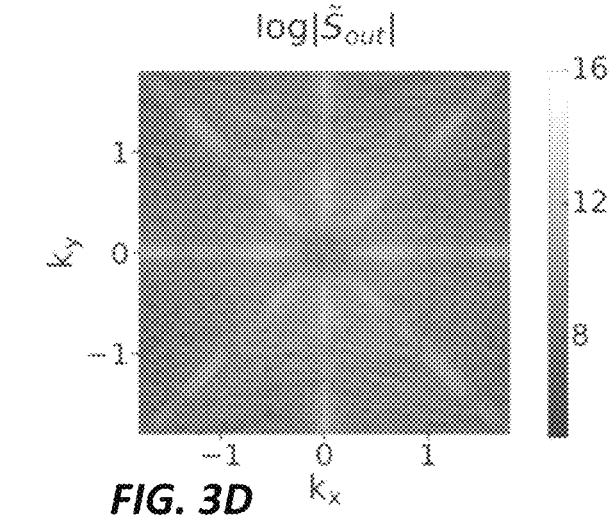
Figure 3E:
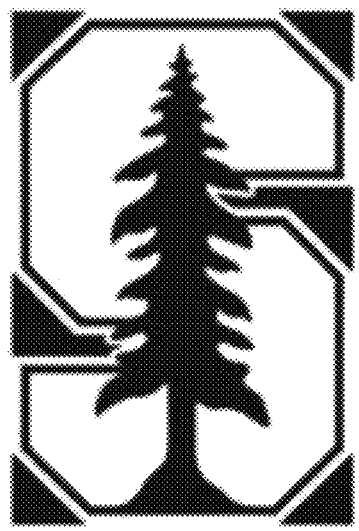
Figure 3F:
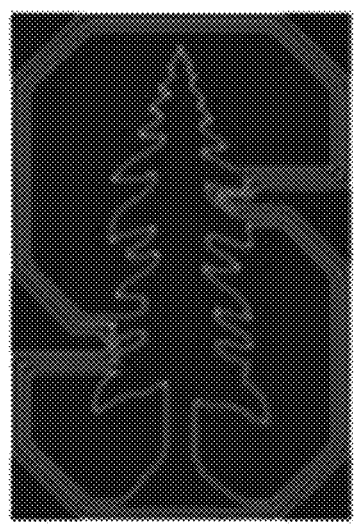
Figure 4A:
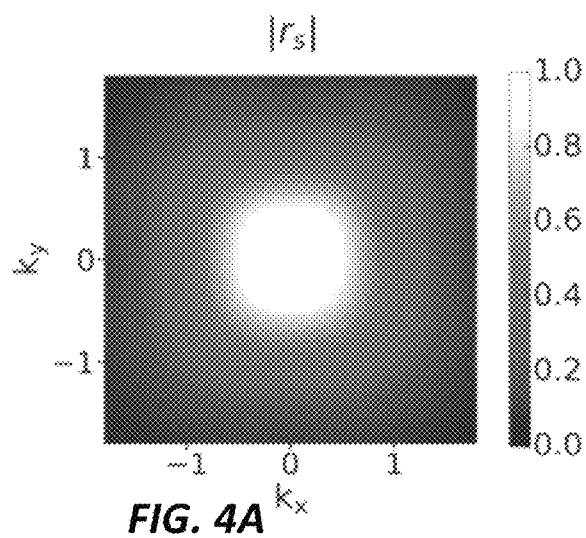
FIGS. 4A-4F show the isotropic low-pass filter performance. (4A) Reflectance for S-polarized light |r$_s$|(k$_x$, k$_y$) at the frequency ω$_0$=0.77098×2πc/a. (4B) |r$_s$| as a function of |k| along a general wavevector direction (φ=14°). (4C) Log plot of the Fourier transform of the field profile for the incident image (4E): log|$\tilde{S}_{in}$|(k$_x$, k$_y$). (4D) Log plot of the Fourier transform of the field profile for the reflected image (4F): log|$\tilde{S}_{out}$|(k$_x$, k$_y$). The high wavevector components have been filtered out. (4E) Incident image |S$_{out}$|$^2$ of the Stanford emblem corrupted by white noise. The image size is 5220a×3456a. (4F) Calculated reflected image |S$_{out}$|$^2$, which reduces the white noise by image smoothing. |k| k$_x$, and k$_y$ are in units of $10^{-2}$×2π/a, according to the current invention.
Figure 4B:
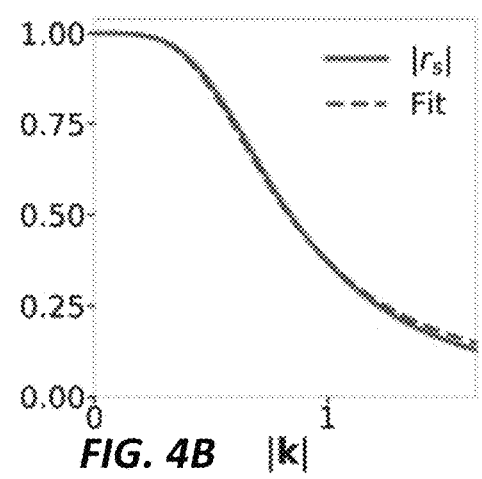

The Laplacian enables image sharpening and edge detection. FIG. 3E shows an incident image of the Stanford emblem, while FIG. 3C plots the Fourier transform of the field profile for this incident image. FIG. 3D shows the calculated Fourier spectrum for the transmitted image, which is obtained by a pointwise product of FIG. 3A and FIG. 3C. The low wavevector components have been filtered out. FIG. 3F is the calculated transmitted image, which shows all the edges with different orientations.

Turning now to the isotropic low-pass filter, FIG. 4 shows the isotropic low-pass filter. FIG. 4A plots the filter transfer function: the reflectance for S-polarized light $|r_s|(k_x, k_y)$ at the frequency $\omega_0=0.77098\times 2\pi c/a$. The transfer function is almost isotropic. FIG. 4B plots $|r_s|$ as a function of $|k|$ along a general wavevector direction ($\phi=14°$) and the fitting result of Eq. (7). The fitting is almost perfect in the wavevector range as shown. These plots confirm that the device indeed operates as an isotropic low-pass filter in this case.

Figure 4C:
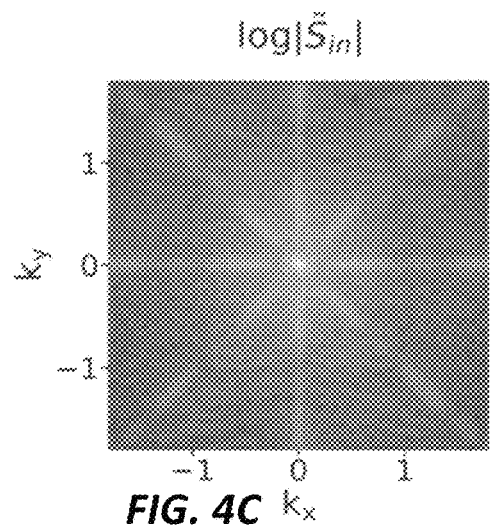
Figure 4D:
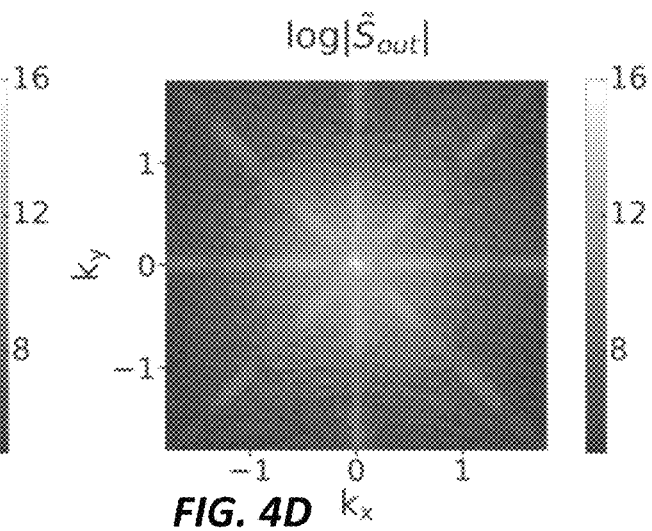
Figure 4E:
Figure 4F:
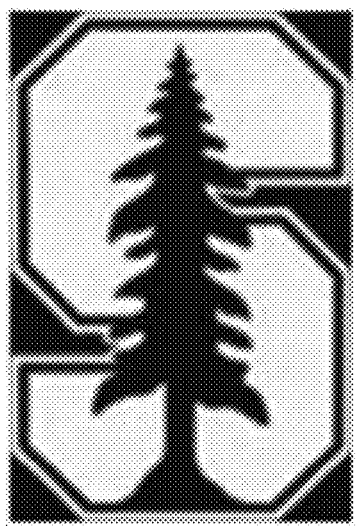

The isotropic low-pass filter accomplishes image smoothing, with applications ranging from character recognition in machine perception, preprocessing functions in the printing and publishing industry, to satellite and aerial image processing. Here, one specific application of the low-pass filter is shown in white noise reduction. FIG. 4E shows an incident image of the Stanford emblem corrupted by white noise, while FIG. 4C plots the Fourier transform of the field profile for this incident image. FIG. 4D shows the calculated Fourier spectrum for the reflected image, which is obtained by a pointwise product of FIG. 4A and FIG. 4C. The high wavevector components have been filtered out. FIG. 4F shows the calculated reflected image, where the white noise has indeed been reduced, demonstrating image smoothing.

Regarding the isotropic band-rejection filter, FIG. 5 illustrates the isotropic band-reject filter. FIG. 5A plots the filter transfer function: the transmittance for S-polarized light $|t_s|(k_x, k_y)$ at the frequency $\omega_q=0.77130\times 2\pi c/a$. The transfer function is almost isotropic. FIG. 5B plots $|t_s|$ as a function of $|k|$ along a general wavevector direction ($\phi=14°$), which shows $|t_s|=0$ at $|t|=0.84\times 10^{-2}\times 2\pi/a$. The transmittance curve is fit with Eq. (8) together with Eq. (1) and $\gamma k \approx \gamma_0$. The fitting is almost perfect in the wavevector range as shown. These plots confirm that the device indeed operates as an isotropic band-reject filter in this case.

Figure 5A:
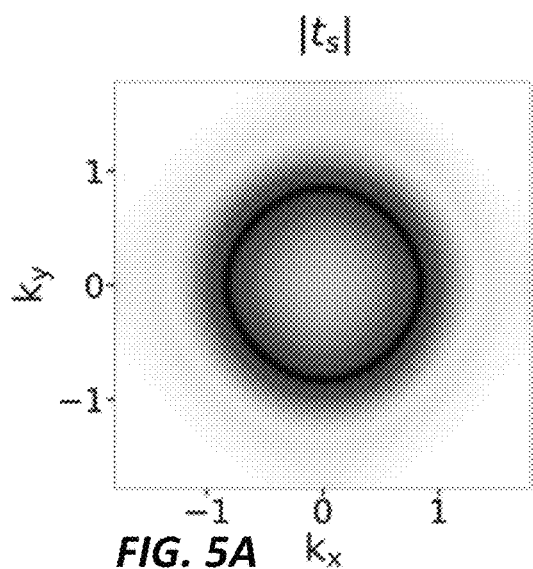
FIGS. 5A-5F show isotropic band-reject filter results. (5A) Transmittance for S-polarized light |k| k$_x$, and k$_y$ at the frequency ω$_q$=0.77130×2πc/a. (5B) |t$_s$| as a function of |k| along a general wavevector direction (φ=14°). (5C) Log plot of the Fourier transform of the field profile for the incident image (5E): log|$\tilde{S}_{in}$|(k$_x$, k$_y$). The sinusoidal noise appears as peaks in the spectrum, which lie on an approximate circle around the origin. (5D) Log plot of the Fourier transform of the field profile for the transmitted image (5F): log|$\tilde{S}_{out}$|(k$_x$, k$_y$). The wavevector components corresponding to the periodic noise have been filtered out. (5E) Incident image |S$_{in}$|$^2$ of the Stanford emblem corrupted by sinusoidal noise. The image size is 5220a×3456a. (5F) Calculated transmitted image |S$_{out}$|$^2$, which eliminates the periodic noise. |k| k$_x$, and k$_y$ are in units of $10^{-2}$×2π/a, according to the current invention.
Figure 5B:
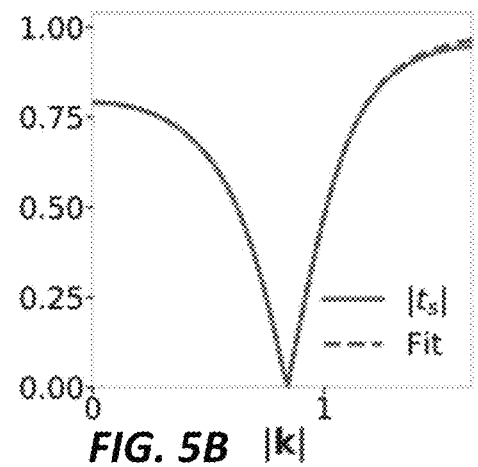
Figure 5C:
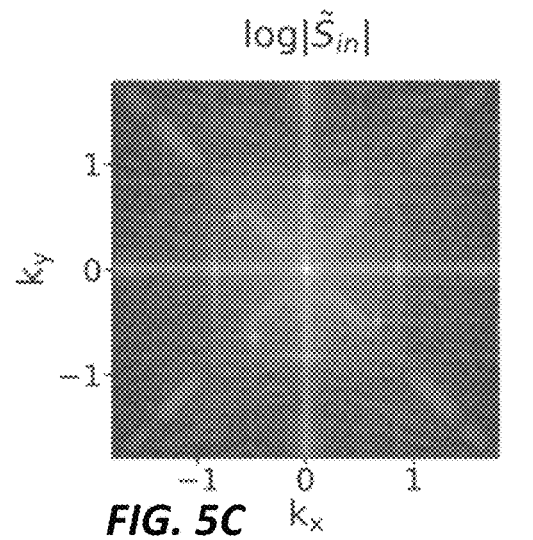
Figure 5D:
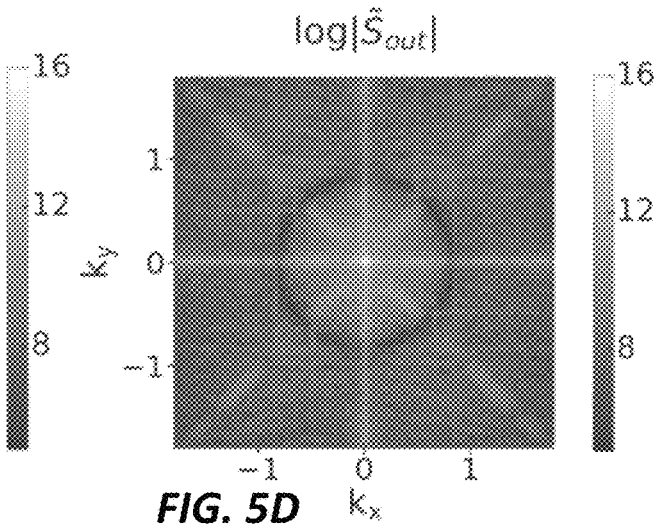
Figure 5E:
Figure 5F:
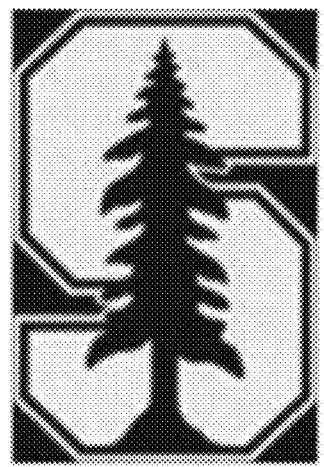

The isotropic band-reject filter can effectively eliminate periodic noise, a common type of noise arising typically from electrical or electromechanical interference during image acquisition. As periodic noise appears as peaks in the Fourier transform at locations corresponding to the wavevectors of the periodic interference, it can be isolated and filtered by band-reject filters. Here, shown is an example of periodic noise reduction with the isotropic band-reject filter. FIG. 5E shows an incident image of the Stanford emblem corrupted by sinusoidal noise, while FIG. 5C plots the Fourier transform of the field profile for this incident image. The periodic noise appears as spectral peaks in the wavevector space, which lie on an approximate circle around the origin. FIG. 5D shows the calculated Fourier spectrum for the transmitted image, which is obtained by a pointwise product of FIG. 5A and FIG. 5C. The spectral peaks corresponding to the periodic noise have been filtered out. FIG. 5F shows the calculated transmitted image, where the periodic noise has indeed been eliminated effectively. Noted here is that the rejected wavevector where the maximum rejection occurs in our band-reject filter can be easily tuned by tuning the light frequency.

Turning now to the isotropic band-pass filter, FIG. 6 illustrates the isotropic band-pass filter. FIG. 6A plots the filter transfer function: the reflectance for S-polarized light $|r_s|(k_x, k_y)$ at the frequency $\omega_q=0.77130\times 2\pi c/a$. The transfer function is almost isotropic. FIG. 6B plots $|r_s|$ as a function of $|k|$ along a general wavevector direction ($\phi=14°$), which shows $|r_s|=1$ at $|k|=0.84\times 10^{-2}\times 2\pi/a$. The reflectance curve is fit with Eq. (9) together with Eq. (1) and $\gamma_k \approx \gamma_0$. The fitting is almost perfect in the wavevector range as shown. These plots confirm that the device indeed operates as an isotropic band-pass filter in this case.

Figure 6A:
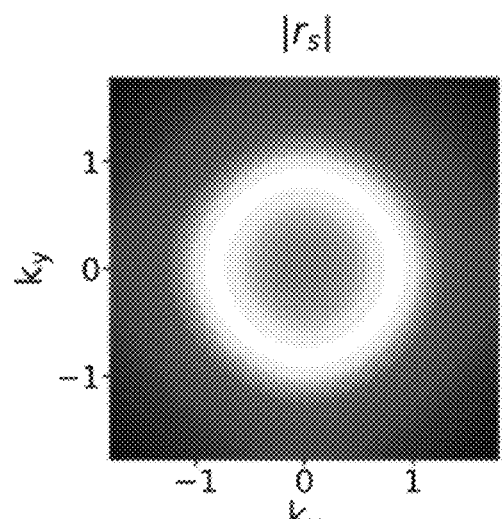
FIGS. 6A-6F show isotropic band-pass filter results. (6A) Reflectance for S-polarized light |r$_s$|k$_x$, k$_y$ at the frequency ω$_q$=0.77130×2πc/a. (6B) |r$_s$| as a function of |k| along a general wavevector direction (φ=14°). (6C) Log plot of the Fourier transform of the field profile for the incident image (6E): log|$\tilde{S}_{in}$|(k$_x$, k$_y$). The sinusoidal noise appears as impulses in the spectrum, which lie on an approximate circle around the origin. (6D) Log plot of the Fourier transform of the field profile for the reflected image (6F): log|$\tilde{S}_{out}$|(k$_x$, k$_y$). (6E) Incident image |S$_{in}$|$^2$ of the Stanford emblem corrupted by sinusoidal noise. The image size is 5220a×3456a. (6F) Calculated reflected image |S$_{out}$|$^2$ which isolates the periodic noise and simplifies its analysis. |k| k$_x$, and k are in units of $10^{-2}$×2π/a, according to the current invention.
Figure 6B:
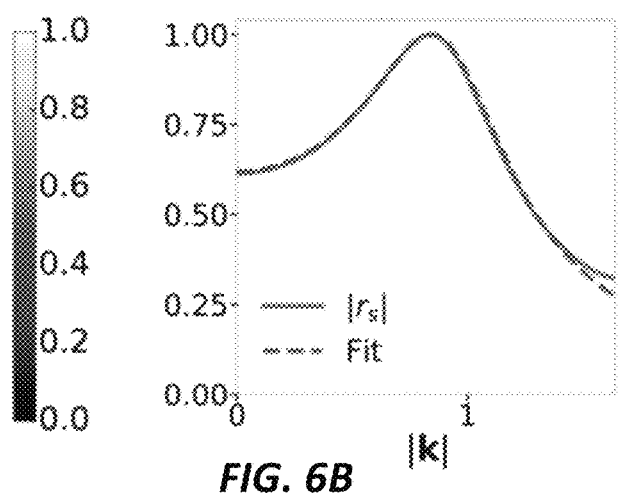
Figure 6C:
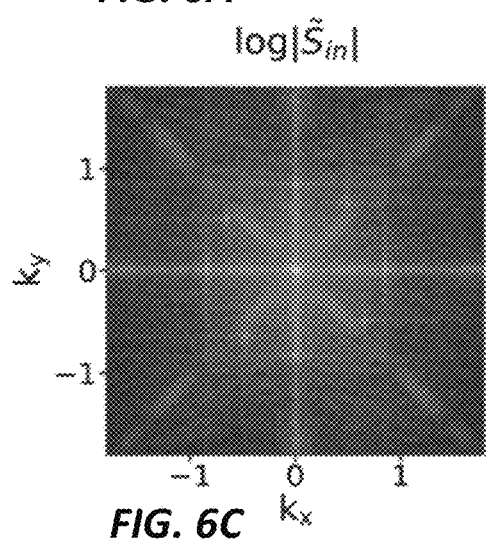
Figure 6D:
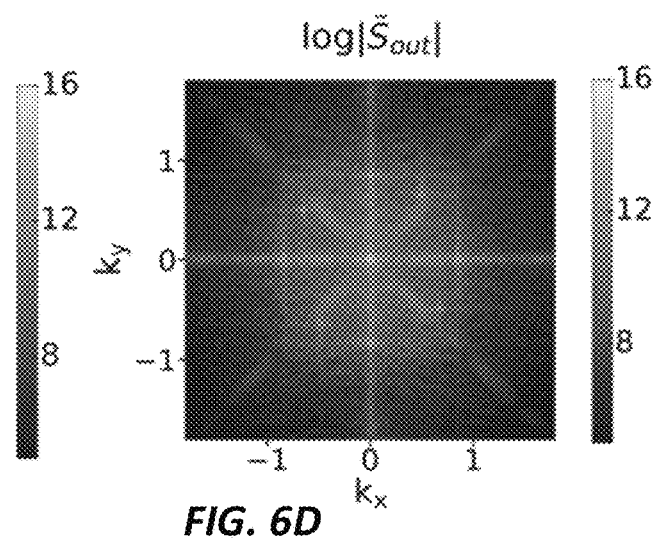
Figure 6E:
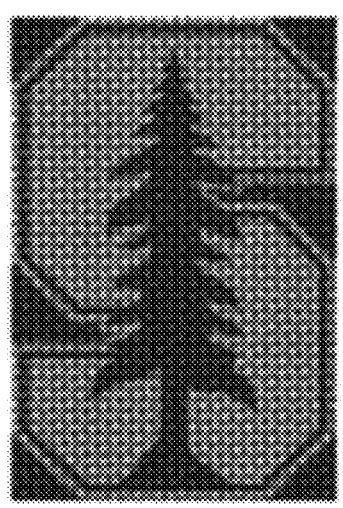
Figure 6F:

The isotropic band-pass filter performs the opposite operation of the band-reject filter. It is quite useful in isolating the effects on an image caused by selected wavevector bands. Shown here is an example of extracting periodic noise patterns with the isotropic band-pass filter. FIG. 6E shows an incident image of the Stanford emblem corrupted by sinusoidal noise [same as FIG. 5E], while FIG. 6C plots the Fourier transform of the field profile for this incident image. FIG. 6D shows the calculated Fourier spectrum for the reflected image, which is obtained by a pointwise product of FIG. 6A and FIG. 6C. FIG. 6F shows the calculated reflected image, where the periodic noise pattern is isolated and appears more clearly. This is useful because it simplifies the analysis of the noise, largely independent of the image content.

The design of isotropic wavevector domain image filters using a photonic crystal slab is based on the guided resonances with isotropic band structure. The same idea can extend to other photonic structures that host resonant modes with isotropic band structures. In particular, a phase-shifted Bragg grating can also perform the four filtering functionalities of our device, but with the transmission/reflection mode flipped.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, one may use other photonic devices rather than photonic crystals that incorporate guided resonances with desired band structure, such as metasurfaces. One may use geometry that is different from a square lattice of air holes; other lattices of other shapes of holes are also possible. Moreover, our design can be readily extended to multiple frequencies, by using a stack of multiple layers. Our design principle is not restricted to specific materials; it is general to any dielectrics.

All such variations are considered to be within the scope and spirit of the present invention as defined by the following claims and their legal equivalents.

What is claimed:

1. An isotropic imaging filter comprising a photonic crystal slab, wherein said photonic crystal slab comprises:
   i) a square lattice of air through holes;
   ii) a dielectric constant;
   iii) a thickness (d);
   iv) a through hole radius (r); and
   v) a lattice constant (a);
   wherein said square lattice of air holes are separated according to a value of said lattice constant, wherein said thickness is configured according to $d=M(a)$, wherein said through hole radii is configured according to $r=N(a)$, wherein said thickness and said hole radii are configured to generate isotropic bands of guided resonances of an incident image;
   further comprising a uniform dielectric slab with a thickness $d_s$ disposed proximal to said photonic crystal slab.

2. The isotropic imaging filter of claim 1, wherein said guided resonances are selected from the group consisting of an isotropic high-pass filtered image, an isotropic low-pass filtered image, an isotropic band-reject filtered image, and an isotropic band-pass filtered image, wherein said isotropic low-pass filtered image and said isotropic band-pass filtered image comprise a reflected incident image, wherein said isotropic high-pass filtered image and said isotropic band-reject filtered image comprise a transmitted incident image.

3. The isotropic imaging filter of claim 1, wherein said photonic crystal slab comprises a dielectric material.

4. The isotropic imaging filter of claim 1, wherein an air gap $d_g$ between said uniform dielectric slab and said photonic crystal slab is configured according to $d_g=T(a)$, wherein said $d_s$ is configured according to $d_s=B(a)$, wherein said $d_s$ and said $d_g$ are disposed to set a background transmission to unity.

5. The isotropic imaging filter of claim 4, wherein said uniform dielectric slab gap factor T has a value that disposes said dielectric slab in a position to set a background transmission to unity.

6. The isotropic imaging filter of claim 1, wherein said $N(a)$ has a value in a range of $N(a) \leq 0.5a$.

7. The isotropic imaging filter of claim 1, wherein said $M(a)$ and said $N(a)$ are optimized together to establish an isotropic band structure of a guided resonance.

* * * * *